United States Patent

Konishi et al.

[11] Patent Number: 5,208,672
[45] Date of Patent: May 4, 1993

[54] HORIZONTAL SYNCHRONIZING SIGNAL GENERATING CIRCUIT

[75] Inventors: Masahiro Konishi, Tokyo; Kazuo Kawamura, Kanagawa; Hitoshi Koike; Satoshi Iwamatsu, both of Tokyo, all of Japan

[73] Assignee: Fuji Photo Film Co., Ltd., Kanagawa, Japan

[21] Appl. No.: 742,430

[22] Filed: Aug. 8, 1991

[30] Foreign Application Priority Data

Aug. 30, 1990 [JP] Japan .................................. 2-226605
Aug. 30, 1990 [JP] Japan .................................. 2-226606

[51] Int. Cl.[5] .............................................. H04N 5/06
[52] U.S. Cl. ...................................... 358/150; 358/158
[58] Field of Search ............... 358/148, 149, 150, 158, 358/337

[56] References Cited

U.S. PATENT DOCUMENTS

| | | | |
|---|---|---|---|
| 4,676,259 | 10/1986 | Moran et al. ...................... | 358/148 |
| 4,769,704 | 9/1988 | Hirai et al. ........................ | 358/150 X |
| 4,872,055 | 10/1989 | Teuling et al. .................... | 358/150 X |
| 4,974,081 | 11/1990 | Yokogawa ........................ | 358/149 X |

Primary Examiner—Victor R. Kostak

[57] ABSTRACT

A horizontal synchronizing reference signal producing circuit produces an internal horizontal synchronizing reference based upon an inputted clock and a reset pulse, a phase comparator compares the phases of a given external horizontal synchronizing reference and an internal horizontal synchronizing reference outputted by the horizontal synchronizing reference and generates a voltage signal conforming to a difference between the two compared phases. A low-pass filter then passes low-frequency components of the voltage signal outputted by the phase comparator, a VCO, whose frequency is controlled by an output voltage signal from the low-pass filter, generates a clock applied to the horizontal synchronizing reference signal producing circuit, a decision circuit determines whether the phase difference between the internal and external horizontal synchronizing reference signal lies within a range in which follow up is capable of being performed by the VCO. A reset pulse generator then generates a reset pulse synchronized to a prescribed edge of the external horizontal synchronizing reference and a reset control circuit inhibits input of the reset to the horizontal synchronizing reference signal producing circuit when the decision circuit determines that the phase difference lies within the follow-up range, and applies the reset signal to the horizontal synchronizing reference signal producing circuit when the decision circuit determines that the phase difference lies outside the follow-up range.

8 Claims, 11 Drawing Sheets

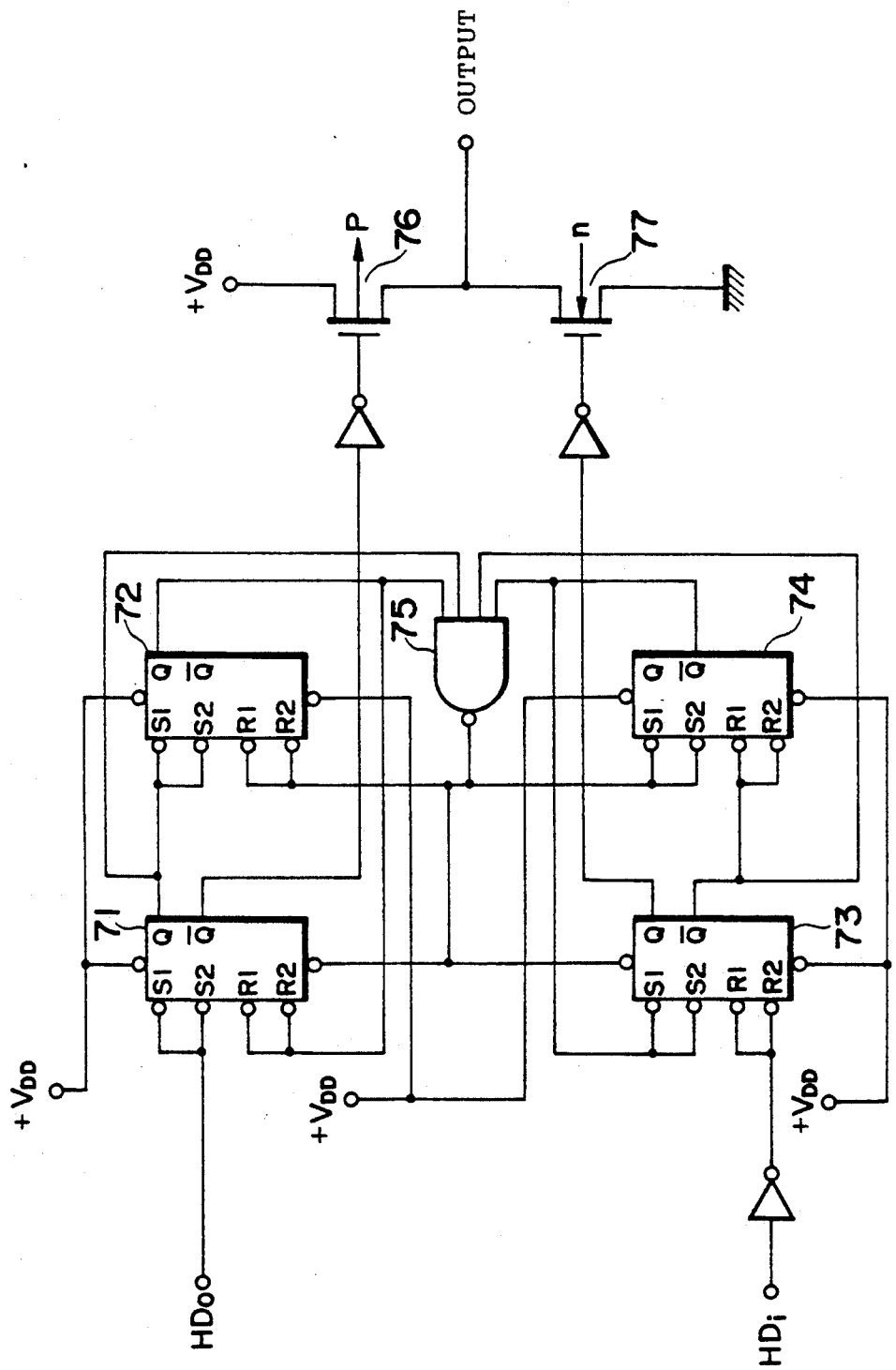

HORIZONTAL SYNCHRONIZING SIGNAL GENERATING CIRCUIT

BACKGROUND OF THE INVENTION

1. Field of the Invention

This invention relates to a horizontal synchronizing signal generating circuit which, based upon an externally applied horizontal synchronizing reference signal, produces and outputs an internal horizontal synchronizing reference signal.

Further, the invention relates to a circuit, and to a synchronizing method, for generating an internal synchronizing signal, which is synchronized to a given external synchronizing signal, by utilizing a PLL (phase-locked loop) which includes an edge detecting-type digital phase comparator.

2. Description of the Related Art

As shown in FIGS. 1 and 2, a circuit for producing an internal horizontal synchronizing reference signal and an internal vertical synchronizing reference signal, which are based upon and synchronized to an externally applied horizontal synchronizing reference signal and an externally applied vertical synchronizing reference signal, and for performing synchronous control based upon the produced internal horizontal and vertical synchronizing reference signals, is used in the subordinate synchronizing signal generator of a system having two, namely a main and a subordinate, synchronizing signal generators (SSG).

In FIG. 1, a main synchronizing signal generator 10 has a reference oscillator 11 which generates a reference clock signal (having a frequency of, e.g., 28 MHz). On the basis of the reference clock signal, the main synchronizing signal generator 10 produces and outputs such signals as a horizontal synchronizing reference signal $HD_0$ and a vertical synchronizing reference signal $VD_0$ for interlaced scanning, and a synchronizing pulse CP for color separation. The horizontal and vertical synchronizing reference signals $HD_0$, $VD_0$ are applied to a subordinate synchronizing signal generator 20A as external horizontal and vertical synchronizing reference signals, respectively. The synchronizing pulse CP is applied to a color-separation synchronizing signal generator 12, which produces a synchronizing signal for color separation.

The subordinate synchronizing signal generator 20A incorporates the above-mentioned synchronous control circuit, which includes a PLL (a phase-locked loop) circuit 21. Using a clock signal generated by the PLL circuit 21, the synchronous control circuit produces internal horizontal and vertical synchronizing signals based upon and synchronized to the external horizontal and vertical synchronizing reference signals $HD_0$, $VD_0$ provided by the main synchronizing signal generator 10. Further, based upon these internal horizontal and vertical synchronizing signals, the subordinate synchronizing signal generator 20A produces and outputs horizontal and vertical drive signals $\phi H$ and $\phi V$ for a CCD (charge-coupled device) 22 used as an image pick-up device, and a sampling signal CDS of a read signal from the CCD 22.

In FIG. 2, the external horizontal and vertical synchronizing reference signals $HD_0$, $VD_0$ are applied to a subordinate synchronizing signal generator 20B from the main synchronizing signal generator 10 along with a clock signal (having a frequency of, e.g., 14 MHz) obtained by frequency-dividing the reference clock signal.

Since the subordinate synchronizing signal generator 20B is supplied with the clock signal, this subordinate synchronizing signal generator 20B need not have a PLL circuit. Using the clock signal inputted thereto, the subordinate synchronizing signal generator 20B produces internal horizontal and vertical synchronizing reference signals synchronized to the external horizontal and vertical synchronizing reference signals $HD_0$, $VD_0$, respectively, produces a composite synchronizing signal C.SYNC from these signals and outputs the composite synchronizing signal. The main synchronizing signal generator 10 in FIG. 2 produces the horizontal and vertical drive signals $\phi H$ and $\phi V$ for the CCD 22.

The systems shown in FIGS. 1 or 2 are applied to systems in which a camera head (the portion which includes the image pick-up device of a still-video camera or a video camera) is separated from a main unit which internally incorporates circuitry (inclusive of a white-balance control circuit, a gamma-correction circuit, a matrix circuit and an encoder, etc.) for processing a video signal picked up by the camera head, by way of example. When the system shown in FIG. 1 is applied, the camera head is provided with the subordinate synchronizing signal generator 20A, and the video-signal processing circuitry is provided with the main synchronizing signal generator 10. The systems shown in FIG. 1 and 2 are further applied to systems including comprising a recorder for recording a video signal as picked up by a still-video camera or a video camera on a recording medium, and a playback device connected to the recorder. If the system illustrated in FIG. 2 were applied to such a system, the recorder would be provided with the main synchronizing signal generator 10 and the playback device would be provided with the subordinate synchronizing signal generator 20B. In such case, the external horizontal and vertical synchronizing reference signals $HD_0$, $VD_0$ could be applied to the subordinate synchronizing signal generator 20B separate from the video signal, or they could be superimposed on the video signal, in which case synchronous separation would be performed by the subordinate synchronizing signal generator 20B. The system shown in FIG. 1 is suitable for a case where the two generators 10, 20A are situated comparatively far apart, while the system shown in FIG. 2 is suitable for a case where the two generators 10, 20B are situated comparatively close together.

To facilitate an understanding of the art, the discussion will be limited to the horizontal synchronizing reference signal. The subordinate synchronizing signal generators 20A, 20B shown in FIGS. 1 and 2 each have a horizontal reset circuit for synchronizing the internal horizontal synchronizing reference signal, which is produced using the clock signal generated by the PLL circuit 21 or the externally applied clock signal, to the external horizontal synchronizing reference signal. Basically, when the internal horizontal synchronizing reference signal produced becomes de-synchronized, the horizontal reset circuit resets the circuit, which produces the internal horizontal synchronizing reference signal, at a predetermined timing of the external horizontal synchronizing reference signal, and forcibly synchronizes the internal horizontal synchronizing reference signal, which is outputted by this circuit, to the external horizontal synchronizing reference signal.

In the case where the main synchronizing signal generator 10 and subordinate synchronizing signal generator 20B use a common clock signal, as illustrated in FIG. 2, a phase difference, which conforms to the transmission rate of the clock signal, develops between the clock signal used by the main synchronizing signal generator 10 and the clock signal used by the subordinate synchronizing signal generator 20B. In order to prevent jitter from being produced by this phase difference between the clock signals used by the two generators 10, 20B, the conventional practice is to provide the horizontal reset circuit with a narrow dead zone whose width is on the order of ±1 period of the clock signal. If the de-synchronization between the internal synchronizing reference signal and the external synchronizing reference signal is within ±1 clock period, the resetting operation is not carried out. In other words, resetting is performed only when the de-synchronization is greater than ±1 clock period.

However, the concept of providing the aforesaid narrow dead zone cannot be employed in the subordinate synchronizing signal generator 20A having the internal PLL circuit 21 shown in FIG. 1. The reason is as follows: The PLL circuit detects a phase difference between the external horizontal synchronizing reference signal and the internal horizontal synchronizing reference signal, and controls the oscillation frequency of a voltage-controlled oscillator, which produces the clock signal dependent upon the phase difference detected. In the narrow dead zone mentioned above, resetting is performed at all times, a correct phase comparison cannot be executed in the PLL circuit and an appropriate value cannot be obtained for the oscillator frequency of the voltage-controlled oscillator. Though an arrangement can be conceived in which the reset operation is not performed at all, this would lengthen the transient response time of the PLL circuit until the PLL circuit is stabilized and correct synchronization is achieved.

An example of a system which requires a circuit for generating an internal synchronizing signal synchronized to external synchronizing signal is the aforementioned image pick-up system having the separate camera head. The camera head of a video camera or a still-video camera has an internal solid-state electronic image pick-up device such as a CCD. The image pick-up device outputs a video signal representing the subject whose image has been picked up. This video signal is sent to a signal processing unit situated at a location remote from the camera head. As mentioned earlier, the signal processing unit internally incorporates processing circuitry, such as the white-balance control circuit, gamma-correction circuit, matrix circuit and encoder, as well as a circuit for generating the synchronizing signals (horizontal and vertical synchronizing signals) used by these circuits. In order to synchronize the operation of the signal processing unit and the operation of the camera head, such as an operation for reading a signal charge from the CCD, the synchronizing signal from the signal processing unit is applied to the camera head as an external synchronizing signal. As shown in FIG. 3, the camera head is provided with a synchronizing signal generating circuit which generates an internal synchronizing signal that is synchronized to an external synchronizing signal.

FIG. 3 illustrates a circuit for generating an internal horizontal synchronizing reference signal $HD_i$ that is synchronized to an external horizontal synchronizing reference signal $HD_0$. This circuit includes a PLL circuit, which is constituted by a phase comparator 61, a low-pass filter 62, a voltage-controlled oscillator 63 and a circuit 64 for producing a horizontal synchronizing reference signal.

The voltage-controlled oscillator 63 generates a clock signal whose center frequency is a high frequency of 14.318 MHz. The clock signal is applied to the circuit 64, which produces the horizontal synchronizing reference signal, and is used in other synchronous control.

The circuit 64 for producing the horizontal synchronizing reference signal includes a frequency divider, logical circuitry, etc., and is adapted to output the internal horizontal synchronizing reference signal $HD_i$ obtained by frequency-dividing the clock signal (by about 910, for example). When the internal horizontal synchronizing reference signal $HD_i$ and the external horizontal synchronizing reference signal $HD_0$ are out of synchronization (for example, when the leading edges of the two horizontal synchronizing reference signals $HD_i$, $HD_0$ are spaced apart by more than a predetermined phase), a reset signal synchronized to the leading edge of the external horizontal synchronizing reference signal $HD_0$ is applied to the circuit 64 for producing the horizontal synchronizing reference signal. As a result, the circuit 64 is reset and generates the internal horizontal synchronizing reference signal $HD_i$ having a leading edge synchronized to the reset signal. Therefore, the internal horizontal synchronizing reference signal $HD_i$ is synchronized to the external horizontal synchronizing reference signal $HD_0$.

The phase comparator 61 is an edge-detecting type digital phase comparator which compares the phases of the external horizontal synchronizing reference signal $HD_0$ provided by the signal processing unit and the internal horizontal synchronizing reference signal $HD_i$ outputted by the circuit 64, and generates an output representing the result of the comparison. The output of the phase comparator 61 is applied as a control voltage to the voltage controlled oscillator 63 via the low-pass filter 62, which is of the charge-pump type and includes a capacitor. The oscillation frequency of the voltage-controlled oscillator 63 varies in conformity with the control voltage applied thereto.

FIG. 4 shows the control voltage/oscillation frequency characteristic of the voltage-controlled oscillator 63. With an increase in the control voltage, the oscillation frequency also increases in proportion. The oscillation frequency of the voltage-controlled oscillator 63 varies by following up the inputted control voltage over a range from a minimum frequency $f_{min}$ to a maximum frequency $f_{max}$.

FIG. 5 illustrates an example of the construction of a leading-edge detecting digital phase comparator for the phase comparator 61.

As shown in FIG. 5, the phase comparator includes a flip-flop 71 for detecting the leading edge of the external horizontal synchronizing reference signal $HD_0$, a flip-flop 72 for latching the result of the detection operation, a flip-flop 73 for detecting the leading edge of the internal horizontal synchronizing reference signal $HD_i$, a flip-flop 74 for latching the result of the detection operation, an AND gate 75 for forcibly resetting the flip-flops 71, 72 and forcibly setting the flip-flops 73, 74, a p-channel FET 76 turned on by an output $\overline{Q}$ of the flip-flop 71, and an n-channel FET 77 turned on by an output Q of the flip-flop 73. The FETs 76, 77 are serially connected between an operating voltage $V_{DD}$ and ground, and the junction between them leads to an output terminal of the phase comparator.

FIGS. 6a and 6b illustrate the operation of the above-described internal horizontal synchronizing reference signal generating circuit (FIGS. 3 and 5).

FIG. 6a illustrates a case where the oscillation frequency of the voltage-controlled oscillator 63 is relatively high (higher than the frequency of the clock signal for producing the external horizontal synchronizing reference signal $HD_0$) and the leading edge of the internal horizontal synchronizing reference signal $HD_i$ is produced earlier than the leading edge of the external horizontal synchronizing reference signal $HD_0$.

In response to the leading edge of the internal horizontal synchronizing reference signal $HD_i$, the flip-flop 73 is reset, so that the n-channel FET 77 is turned on by the output Q of the flop-flop. As a result, the output of the phase comparator 61 falls from a high-impedance (Hi-Z) level to the L level. When the leading edge of the external horizontal synchronizing reference signal $HD_0$ subsequently appears, the flip-flop 73 is forcibly set, and therefore the n-channel FET 77 returns to the off state. The output voltage of the low-pass filter 62 falls as a result of the output of the phase comparator 61 temporarily assuming the L level (namely for a period of time corresponding to the phase difference between the two signals $HD_i$ and $HD_0$). The output voltage of the filter 62 is applied to the voltage-controlled oscillator 63, which possesses the control-voltage/oscillation-frequency characteristic shown in FIG. 4. As a result, the oscillation frequency of the voltage-controlled oscillator 63 declines in response to the decline in the output voltage of low-pass filter 62. Accordingly, the PLL circuit operates in a direction which reduces the phase difference between the two horizontal synchronizing reference signals $HD_0$, $HD_i$, so that the internal horizontal synchronizing reference signal $HD_i$ is synchronized to the external horizontal synchronizing reference signal $HD_0$.

FIG. 6b illustrates a case where the oscillation frequency of the voltage-controlled oscillator 63 is relatively low and the leading edge of the external horizontal synchronizing reference signal $HD_0$ occurs earlier than the leading edge of the internal horizontal synchronizing reference signal $HD_i$ (namely a case where the phase difference resides outside the limits of a dead zone in which resetting is forbidden). In FIG. 6b, the reset operation which actually takes place is indicated by the solid line; the dashed line indicates the operation that would take place if a second reset signal were not applied to the circuit 64 which produces the horizontal synchronizing reference signal.

The operation indicated by the dashed line will be described first.

In response to the leading edge of the external horizontal synchronizing reference signal $HD_0$, the flip-flop 71 is set, so that the p-channel FET 76 is turned on by the output $\overline{Q}$ of this flip-flop 71. As a result, the output of the phase comparator 61 rises from the high-impedance level to the H level. When the leading edge of the internal horizontal synchronizing reference signal $HD_i$ subsequently appears, the flip-flop 71 is forcibly reset, and therefore the p-channel FET 76 returns to the off state. The output of the phase comparator 61 temporarily assumes the H level, whereby the output voltage of the low-pass filter 62 rises, the oscillation frequency of the voltage-controlled oscillator 63 increases and the internal horizontal synchronizing reference signal $HD_i$ is synchronized to the external horizontal synchronizing reference signal $HD_0$.

However, when the phase difference between the signals $HD_i$ and $HD_0$ is large and falls outside the dead zone, the circuit 64 which produces the horizontal synchronizing reference signal is reset at the timing of the leading edge of the external horizontal synchronizing reference signal $HD_0$, and the internal horizontal synchronizing reference signal $HD_i$ produced has a leading edge synchronized to the leading edge of the external horizontal synchronizing reference signal $HD_0$. As a consequence, the output of the phase comparator 61 is held in the high-impedance state and the output of the low-pass filter 62 does not change. In other words, in this case the oscillation frequency of the voltage-controlled oscillator 63 remains permanently unchanged and absolutely no pull-in operation is performed by the PLL circuit.

SUMMARY OF THE INVENTION

Accordingly, an object of the present invention according to a first aspect thereof is to provide a horizontal synchronizing signal generating circuit which includes a PLL, wherein appropriate resetting processing is executed so that an internal horizontal synchronizing reference signal can quickly be synchronized to an external horizontal synchronizing reference signal.

An object of the present invention according to a second aspect thereof is to provide a horizontal synchronizing signal generating circuit capable of being used in both a conventional subordinate synchronizing signal generator which includes a conventional PLL circuit, and the subordinate synchronizing signal generator which shares a clock signal with the main synchronizing signal generator.

An object of the present invention according to a third aspect thereof is to provide a conventional synchronizing signal generating circuit having a PLL which includes a conventional edge-detecting digital phase comparator, wherein the circuit is so adapted that the pull-in operation of the PLL can be performed with certainty at all times.

According to the first aspect of present invention, there is provided a horizontal synchronizing signal generating circuit which comprises a horizontal synchronizing reference signal producing circuit for producing an internal horizontal synchronizing reference signal based upon an inputted clock signal and a reset pulse, a phase comparator for comparing the phase of a given external horizontal synchronizing reference signal and the phase of an internal horizontal synchronizing reference signal outputted by the horizontal synchronizing reference signal producing circuit, and generating a voltage signal conforming to a difference between the two compared phases, a low-pass filter for passing low-frequency components of the voltage signal outputted by the phase comparator, a voltage-controlled oscillator, whose frequency is controlled by an output voltage signal from the low-pass filter, for generating a clock signal applied to the horizontal synchronizing reference signal producing circuit, a decision circuit for determining whether the phase difference between the phases of the internal horizontal synchronizing reference signal and external horizontal synchronizing reference signal lies within a follow-up range in which follow-up is capable of being performed by the voltage-controlled oscillator, a reset-pulse generating circuit for generating a reset pulse synchronized to a prescribed edge of the external horizontal synchronizing reference signal, and a reset control circuit for inhibiting input of the reset pulse to the horizontal synchronizing reference signal producing circuit when the decision circuit determines that the phase difference lies within the follow-up range, and applying the reset signal to the horizontal synchronizing reference signal producing circuit when the decision circuit determines that the phase difference lies outside the follow-up range.

The follow-up range in which the voltage-controlled oscillator is capable of performing follow-up refers to a range between the maximum and minimum oscillation frequencies of the voltage-controlled oscillator. A check is performed to determine whether the phase difference between the internal and external horizontal synchronizing reference signals resides in a phase-difference range which is such that a commensurate control voltage produced by the phase comparator will fall between a first-boundary control voltage which will cause a maximum oscillation frequency to be produced by the voltage-controlled oscillator and a second-boundary control voltage which will cause a minimum oscillation frequency to be produced by the voltage-controlled oscillator. In actuality, it will suffice if the phase-difference range serving as the criterion is set in the vicinity of a phase-difference range which corresponds to the follow-up range.

A PLL circuit comprises the horizontal synchronizing reference signal producing circuit, phase comparator, low-pass filter and voltage-controlled oscillator.

When the phase difference between the internal and external horizontal synchronizing reference signals is outside the range in which the voltage-controlled oscillator is capable of performing follow-up, the PLL circuit has difficulty stabilizing and considerable time is required for the internal horizontal synchronizing reference signal to become synchronized to the external horizontal synchronizing reference signal. According to the first aspect of the invention, this problem is dealt with as follows: The reset pulse is applied to the horizontal synchronizing reference signal producing circuit, and the internal horizontal synchronizing reference signal generated by this circuit is compelled to take on a fixed timing relationship relative to the external horizontal synchronizing reference signal. Consequently, from this point onward, the PLL circuit attains a stable state in which normal synchronous control is possible, and the internal horizontal synchronizing reference signal is rapidly synchronized to the external horizontal synchronizing reference signal by the usual synchronizing function of the PLL circuit. If the aforementioned phase difference is comparatively small, it will fall sufficiently within the follow-up range of the voltage-controlled oscillator. At this time, therefore, resetting of the horizontal synchronizing reference signal producing circuit is inhibited. As a consequence, a situation is avoided in which the phase comparison in the PLL circuit does not take place correctly owing to a regularly executed resetting operation. Thus, it is possible for the internal horizontal synchronizing reference signal to be synchronized to the external horizontal synchronizing reference signal at high speed.

According to a second aspect of the present invention, there is provided a horizontal synchronizing signal generating circuit which comprises a horizontal synchronizing reference signal producing circuit for producing an internal horizontal synchronizing reference signal based upon an inputted clock signal and a reset pulse, a masking signal generating circuit for generating a first masking signal which decides a first dead zone in the vicinity of a prescribed edge of the internal horizontal synchronizing reference signal, and a second masking signal which decides a second dead zone wider than the first dead zone, a dead-zone changeover circuit for selecting either the first or second masking signal dependent upon a dead-zone changeover signal, a reset-pulse generating circuit for generating a reset pulse synchronized to a prescribed edge, which corresponds to the prescribed edge of the internal horizontal synchronizing reference signal, of a given external horizontal synchronizing reference signal, and a reset control circuit for determining whether the prescribed edge of the external horizontal synchronizing reference signal lies within the dead zone decided by the masking signal selected by the dead-zone changeover circuit, and applying the reset pulse to the horizontal synchronizing reference signal producing circuit when the prescribed edge does not lie within the dead zone.

The dead zone is a range which inhibits resetting of the horizontal synchronizing reference signal producing circuit. The first dead zone is set to a width suited to a first type of conventional system, namely to a subordinate synchronizing signal generator which shares the clock signal with the main synchronizing signal generator. For example, the first dead zone is set to ±1 clock pulse period, as mentioned earlier. The second dead zone is set to a width suited to a second type of conventional system including a subordinate synchronizing signal generator having an internal PLL circuit. For example, the second dead zone is set exactly to the follow-up range of the voltage-controlled oscillator contained in the PLL circuit, as in the apparatus according to the first aspect of the invention.

Thus, according to the horizontal synchronizing signal generating circuit according to the second aspect of the invention, a dead-zone changeover signal is produced dependent upon the type of conventional system used. When the system second type of conventional is used, the second masking signal which decides the second dead zone is selected. When the first type of conventional is used, the first masking signal which decides the first dead zone is selected. It is then determined whether the prescribed edge of the external horizontal synchronizing reference signal resides within the dead zone thus selected. The horizontal synchronizing reference signal producing circuit is reset only if the prescribed edge does not reside in the selected dead zone. Thus, the horizontal synchronizing signal generating circuit, of the invention is applicable to both types of conventional systems; and the circuit is capable of executing horizontal reset processing suited to each system.

According to a third aspect of the present invention, there is provided a synchronizing signal generating circuit which comprises a voltage-controlled oscillator for generating a clock signal in conformity with a control voltage applied thereto, wherein the higher the control voltage, the higher the frequency of the clock signal, a synchronizing signal producing circuit for producing an internal synchronizing signal by frequency-dividing the clock signal provided by the voltage-controlled oscillator, and generating an internal synchronizing signal, which begins from a prescribed edge of a given external synchronizing signal, when a reset signal synchronized to the prescribed edge is applied, an edge-detecting digital phase comparator for detecting, based on a comparison with the prescribed edge, a phase difference between the internal synchronizing signal outputted by the synchronizing signal producing circuit and the external synchronizing signal, and for outputting a digital signal which represents the phase difference detected, a low-pass filter responsive to a change in the digital signal outputted by the phase comparator for generating a higher control voltage when the phase of the internal synchronizing signal leads the phase of the external synchronizing signal, and a lower control voltage when the phase of the internal synchronizing signal lags behind the phase of the external synchronizing signal, and applying the control voltage generated to the voltage-controlled oscillator, and a forcible pull-in circuit for applying, to the voltage-controlled oscillator for a prescribed period of time immediately following introduction of power, a control voltage high enough to generate a clock signal whose frequency is higher than a central frequency of the voltage-controlled oscillator.

According to a fourth aspect of the present invention, there is provided a synchronizing method of a synchronizing signal generating circuit having a voltage-controlled oscillator for generating a clock signal whose frequency varies monotonously in conformity with a control voltage applied thereto, a synchronizing signal producing circuit for producing an internal synchronizing signal by frequency-dividing the clock signal provided by the voltage-controlled oscillator, and generating an internal synchronizing signal, which begins from a prescribed edge of a given external synchronizing signal, when a reset signal synchronized to the prescribed edge is applied, an edge-detecting digital phase comparator for detecting, based on a comparison with the prescribed edge, a phase difference between the internal synchronizing signal outputted by the synchronizing signal producing circuit and the external synchronizing signal, and for outputting a digital signal which represents the phase difference detected, and a low pass filter for generating a control voltage, which is to be applied to the voltage-controlled oscillator, whose level varies in response to a change in the digital signal outputted by the phase comparator. The synchronizing method comprises the steps of applying to the voltage-controlled oscillator at start-up of the synchronizing signal generating circuit, a control voltage whose level causes generation of a clock signal whose frequency is higher than a center frequency of the voltage-controlled oscillator, and synchronizing the internal synchronizing signal to the external synchronizing signal in a process which causes the frequency of the clock signal to change from a higher to a lower frequency.

According to the third and fourth aspects of the present invention, the frequency of the clock signal outputted by the voltage-controlled oscillator is set to a high value at the start-up of the synchronizing signal generating circuit. Accordingly, a prescribed edge of the internal synchronizing signal always occurs ahead of the corresponding prescribed edge of the external synchronizing signal. As a result, the PLL circuit of the synchronizing signal generating circuit is always pulled in, and the internal synchronizing signal is synchronized to the external synchronizing signal stably and reliably in a process which causes the frequency of the clock signal to change from a higher to a lower frequency.

The reference clock signal which serves as the foundation for producing the external synchronizing signal generally is set to a frequency identical with the center frequency of the voltage-controlled oscillator, a frequency which is a whole-number multiple of the center frequency, or a frequency which is a whole-number fraction of the center frequency. Therefore, at the start-up of the synchronizing signal generating circuit, it will suffice to set the oscillation frequency of the voltage-controlled oscillator to be higher than the center frequency thereof.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 5 is a circuit diagram showing an example of the construction of a leading-edge detecting digital phase comparator;

FIGS. 7 through 11 illustrate embodiments according to first and second aspects of the present invention, in which:

FIG. 7 is a block diagram showing the construction of a subordinate synchronizing signal generator;

FIG. 8 is a timing chart showing external horizontal and vertical synchronizing reference signals;

FIG. 9 is a circuit diagram showing the construction of a horizontal synchronizing reference signal generating circuit; and FIGS. 10 and 11 are timing charts showing the operation of the circuit of FIG. 9; and FIGS. 12 and 13 illustrate an embodiment according to third and fourth aspects of the present invention, in which:

FIG. 12 is a circuit diagram showing part of a horizontal synchronizing reference signal generating circuit; and FIG. 13 is a waveform diagram showing the operation of the circuit shown in FIG. 12.

DESCRIPTION OF THE PREFERRED EMBODIMENTS

Figure 1:
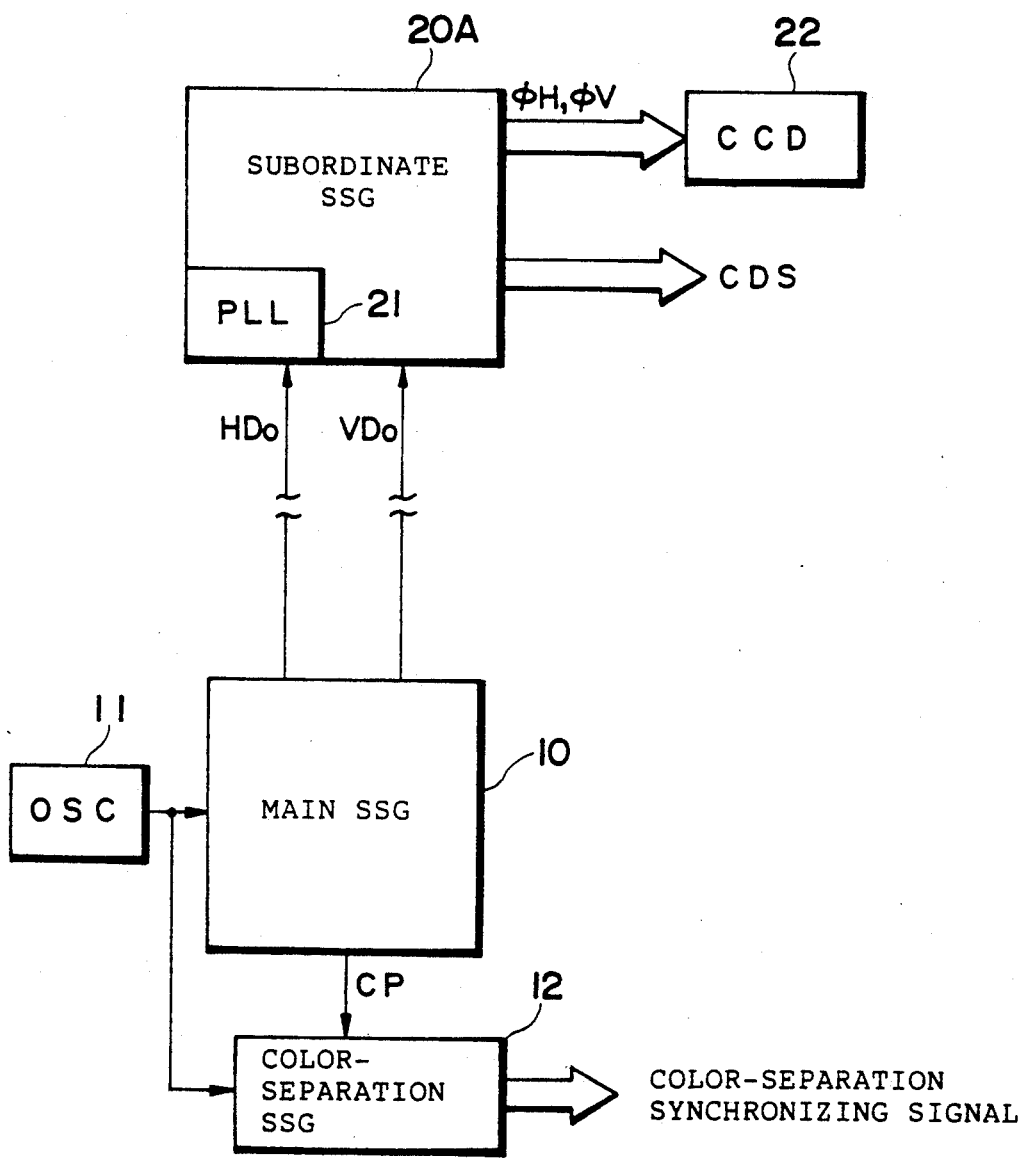
FIGS. 1 and 2 are block diagrams each illustrating an example of a system which includes a main synchronizing signal generator and a subordinate synchronizing signal generator.
Figure 2:
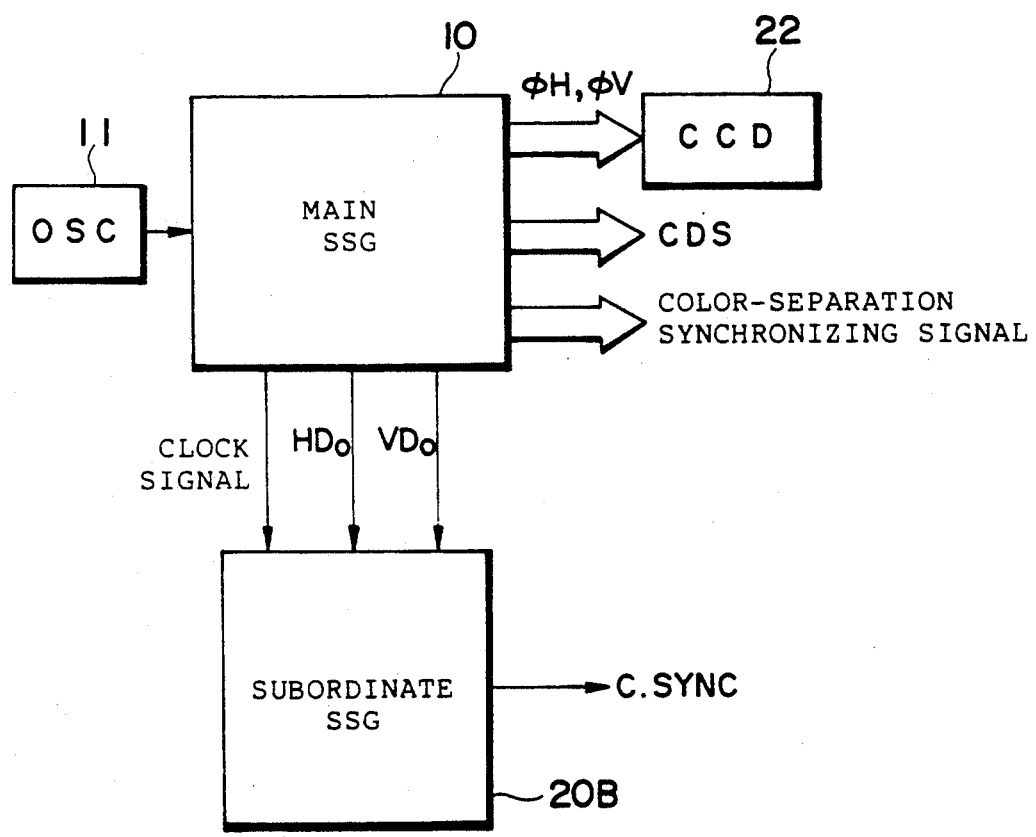
Figure 7:
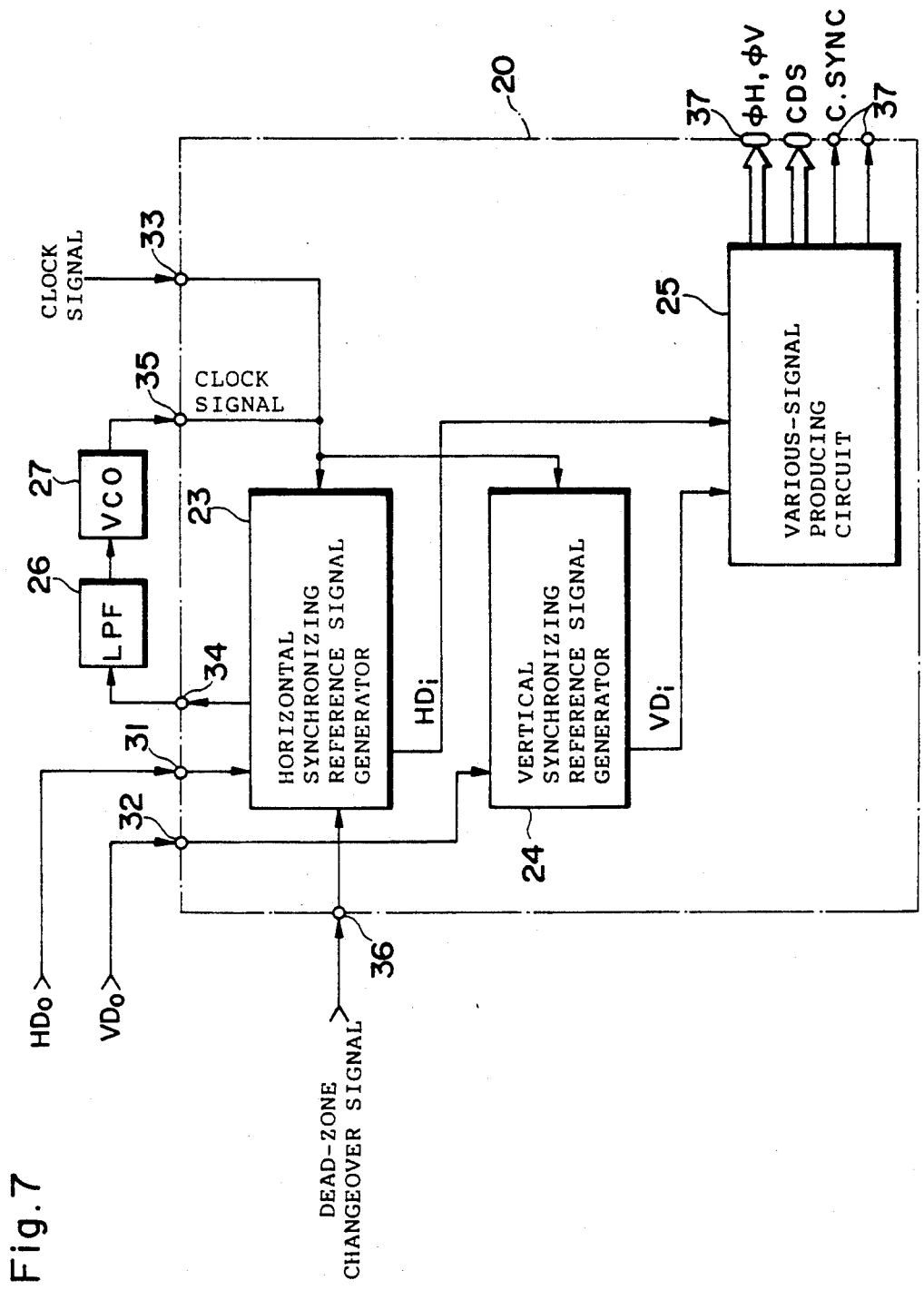

FIG. 7 illustrates the general features of the construction of a subordinate synchronizing signal generator capable of being used in the systems shown in both FIGS. 1 and 2.

As shown in FIG. 7, a subordinate synchronizing reference signal generator 20 includes a horizontal synchronizing reference signal generating circuit 23, a vertical synchronizing reference signal generating circuit 24, and a circuit 25 for producing various timings or synchronizing signals. The subordinate synchronizing signal generator 20 has input terminals 31, 32 for an external horizontal synchronizing reference signal $HD_0$ and an external vertical synchronizing reference signal $VD_0$ provided by a main synchronizing signal generator, terminals 34, 35 for connection to an externally attached low-pass filter 26 and voltage-controlled oscillator 27, which constitute part of a PLL circuit, an input terminal 33 for a clock signal supplied by the main synchronizing signal generator, an input terminal 36 for a dead-zone changeover signal, and terminals 37 for outputting drive signals $\phi H$, $\phi V$, a sampling signal CDS and a synchronizing signal C.SYNC produced by the circuit 25 for producing various signals.

The external horizontal synchronizing reference signal $HD_0$ is applied to the horizontal synchronizing reference signal generating circuit 23 via the input terminal 31, and the external vertical synchronizing reference signal $VD_0$ is applied to the vertical synchronizing reference signal generating circuit 24 via the input terminal 32.

In a case where the subordinate synchronizing signal generator 20 is used in the system shown in FIG. 1, the low-pass filter 26 and voltage-controlled oscillator 27 are connected between the terminals 34, 35 in order to construct the PLL circuit. The oscillating output of the voltage-controlled oscillator 27 enters the horizontal synchronizing reference signal generating circuit 23 as a clock signal via the terminal 35. In a case where the subordinate synchronizing signal generator 20 is used in the system shown in FIG. 2, it is unnecessary to connect the low-pass filter 26 and voltage-controlled oscillator 27. Instead, the clock signal supplied by the main synchronizing signal generator is fed into the horizontal synchronizing reference signal generating circuit 23 through the terminal 33.

It is not always required that the center frequency of the voltage-controlled oscillator 27 be the same as the frequency of the clock signal supplied by the main synchronizing signal generator and inputted via the terminal 33. If these frequencies are different, however, a frequency dividing circuit or the like would be provided in order make the frequency of the clock signal inputted to the horizontal synchronizing reference signal generating circuit 23 the same when the subordinate synchronizing signal 20 is used in the system of FIG. 1 and the system of FIG. 2. For example, in a case where the center frequency of the voltage-controlled oscillator 27 is 28 MHz and the frequency of the clock signal supplied to the terminal 33 from the main synchronizing signal generator is 14 MHz, a frequency dividing circuit would be provided for halving the frequency of the clock signal inputted from the voltage-controlled oscillator 27 via the terminal 35, and the resulting signal would be applied to the horizontal synchronizing reference signal generating circuit 23 as a 14 MHz clock signal. These clock signals are applied also to the vertical synchronizing reference signal generating circuit 24.

Also applied to the horizontal synchronizing reference signal generating circuit 23, regardless of the system to which the arrangement is applied, is a dead-zone changeover signal, which enters via the terminal 36.

The horizontal synchronizing reference signal generating circuit 23 uses the clock signal inputted thereto to produce the internal horizontal synchronizing reference signal $HD_i$ synchronized to the external horizontal synchronizing reference signal $HD_0$, and the vertical synchronizing reference signal generating circuit 24 uses the clock signal inputted thereto to produce the internal vertical synchronizing reference signal $VD_i$ synchronized to the external vertical synchronizing reference signal $VD_0$. It is possible for these two generating circuits 23, 24 to make common use of a frequency dividing circuit (contained in a decoder 42, described later), etc., included therein. The internal horizontal and vertical synchronizing reference signals $HD_i$, $VD_i$ produced and outputted by the respective generating circuits 23, 24 are applied to the circuit 25, which produces the various signals $\phi H$, $\phi V$, CDS, C.SYNC, etc., based upon these input signals $HD_i$, $VD_i$.

Figure 8:
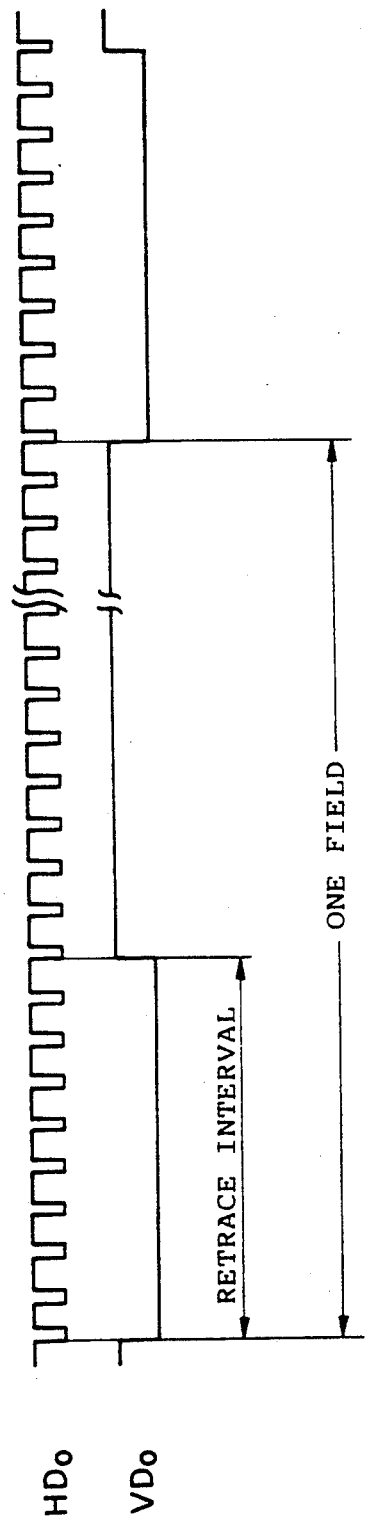

FIG. 8 illustrates an example of the external horizontal synchronizing reference signal $HD_0$ and an example of the external vertical synchronizing reference signal $VD_0$.

Figure 9:
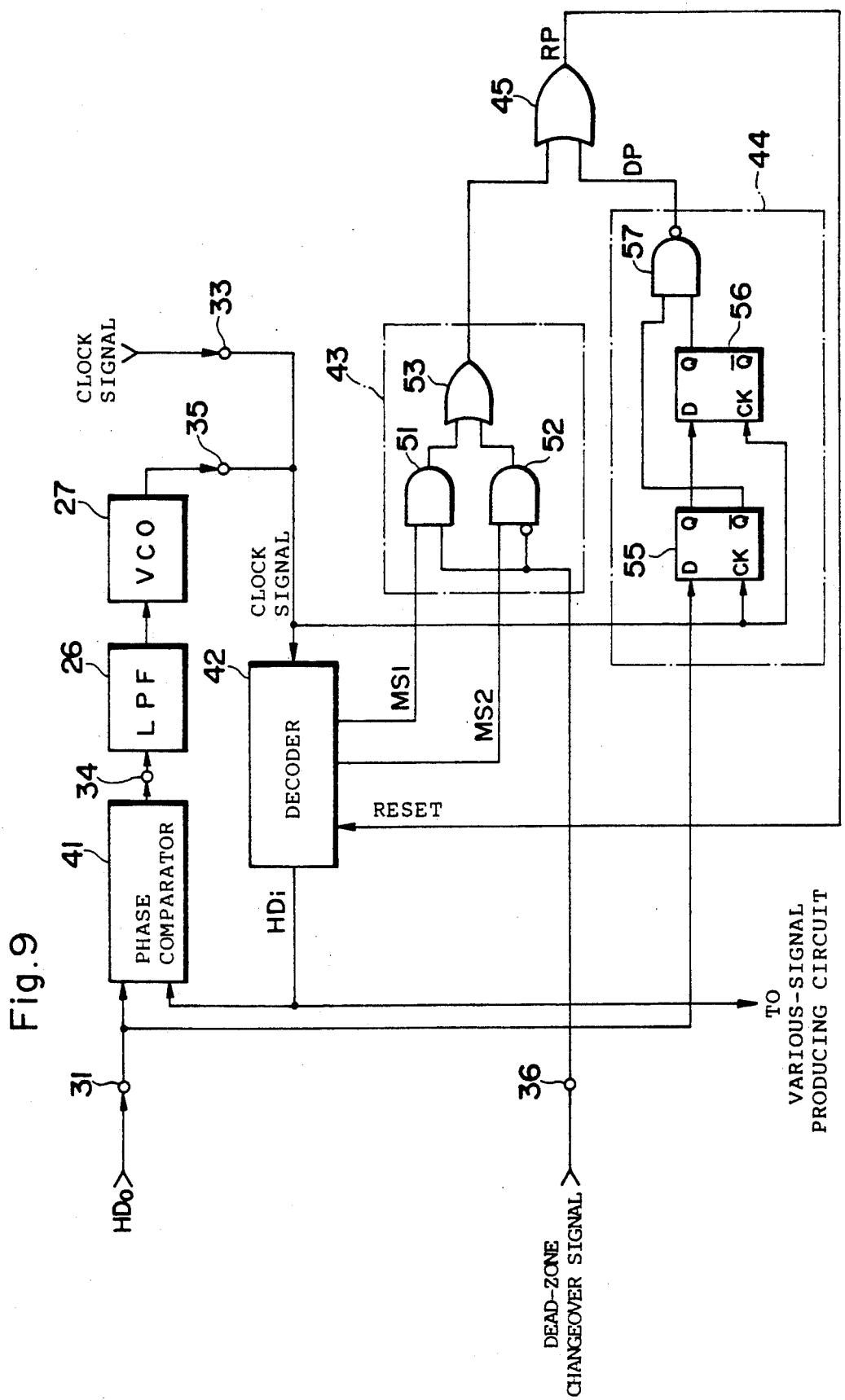
Figure 10:
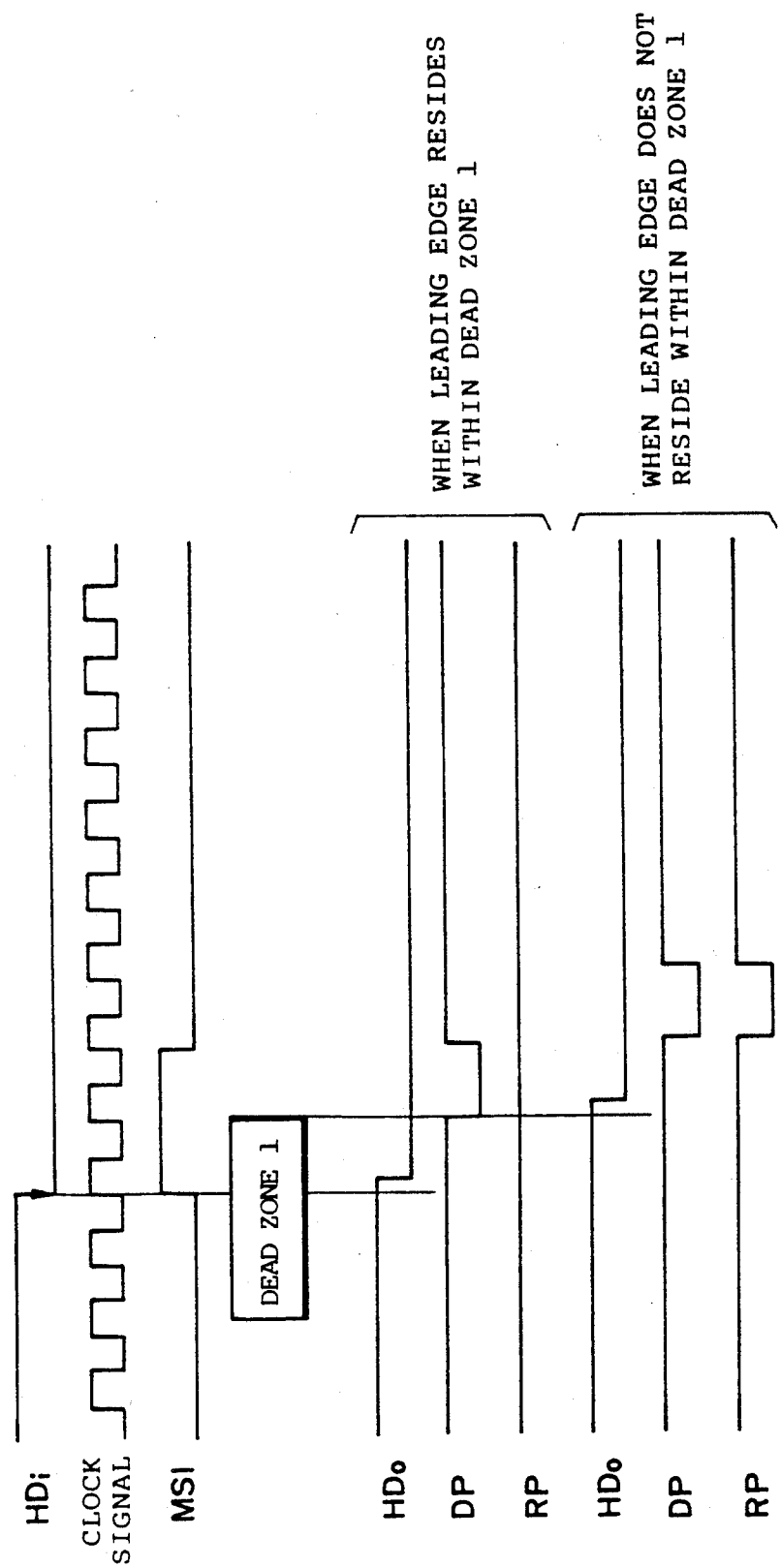
Figure 11:
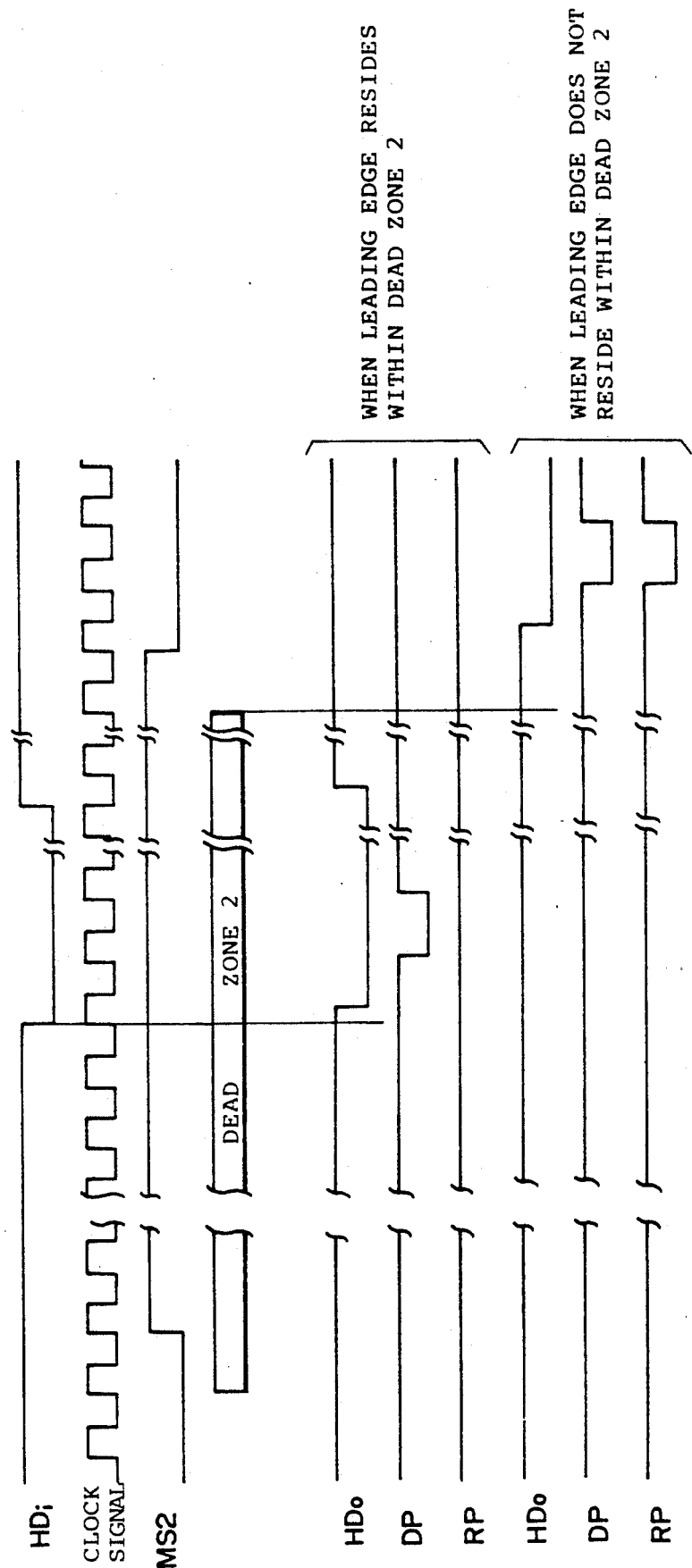

FIG. 9 illustrates a specific example of the horizontal synchronizing reference signal generating circuit 23, in which components identical with those shown in FIG. 7 are designated by like reference characters. FIGS. 10 and 11 are timing charts each showing the operation of the circuit shown in FIG. 9.

A PLL circuit is constructed by the phase comparator 41, low-pass filter 26, voltage-controlled oscillator 27 and a decoder 42. The voltage-controlled oscillator 27 generates a clock signal having a suitable frequency (e.g., 14 MHz) as its center frequency. The oscillation frequency of the voltage-controlled oscillator 27 is controlled by the output voltage of the phase comparator 41 supplied via the low-pass filter 26. The decoder 42 includes a circuit for frequency-dividing the clock signal which enters from the voltage-controlled oscillator 27, a counter, logical circuitry, etc., and uses the input clock signal to produce the internal horizontal synchronizing reference signal $HD_i$. The external horizontal synchronizing reference signal $HD_0$ supplied by the main synchronizing signal generator and the internal horizontal synchronizing reference signal $HD_i$ outputted by the decoder 42 are applied to the phase comparator 41, which outputs a voltage signal conforming to the phase difference between these two signals. As a result, the internal horizontal synchronizing reference signal $HD_i$ generated by the decoder 42 as a consequence of reset processing (described later) of the decoder 42 is synchronized to the external horizontal synchronizing reference signal $HD_0$.

In a case where the low-pass filter 26 and voltage-controlled oscillator 27 are not provided, the clock signal supplied by the main synchronizing signal generator through the terminal 33 is applied to the decoder 42, and therefore the decoder 42 generates the internal horizontal synchronizing reference signal $HD_i$. In this case, the internal horizontal synchronizing reference signal $HD_i$ generated by the decoder 42 as a result of reset processing of the decoder 42 is synchronized to the external horizontal synchronizing reference signal $HD_0$.

The reset processing of the decoder 42 involves bringing the leading edge (the negative-going transition) of the internal horizontal synchronizing reference signal $HD_i$ generated by the decoder 42 into agreement with the leading edge of the external horizontal synchronizing reference signal $HD_0$ at a suitable timing. A reset pulse is applied to the decoder 42 from an OR gate 45, described below.

The decoder 42 further generates masking signals MS1, MS2 respectively representing first and second dead zones each of which has a predetermined duration and is centered on the leading edge of the generated internal horizontal synchronizing reference signal $HD_i$. The dead zones 1 and 2 are for inhibiting entry of the reset pulse RP to the decoder 42.

The dead zone 1 is applied to the case where the subordinate synchronizing signal generator 20 is used in the system shown in FIG. 2 and, as shown in FIG. 10, possesses a very narrow width in terms of time. For example, the dead zone 1 is set to have a duration which is ±1 period of the clock signal.

The dead zone 2 is applied to the case where the subordinate synchronizing signal generator 20 is used in the system shown in FIG. 1 and, as shown in FIG. 11, possesses a very broad width in terms of time. The dead zone 2 is set to a width which is substantially the maximum possible width of the follow-up range of oscillation frequencies of the voltage-controlled oscillator 27. The follow-up range in which the voltage-controlled oscillator 27 is capable of performing follow-up refers to a range between the maximum and minimum oscillation frequencies of the voltage. controlled oscillator 27. The phase difference between the internal horizontal synchronizing reference signal $HD_i$ and external horizontal synchronizing reference signal $HD_0$ (namely the time difference between the leading edges of these two signals) has such a range that a commensurate control voltage produced by the phase comparator 41 will fall between a first boundary-control voltage which will cause a maximum oscillation frequency to be produced by the voltage-controlled oscillator 27 and a second-boundary control voltage which will cause a minimum oscillation frequency to be produced by the voltage-controlled oscillator 27. By way of example, the dead zone 2 is set to exceed 10% of one period of the horizontal synchronizing reference signal.

The dead zones 1, 2 are offset by one period of the clock signal from the masking signals MS1, MS2 representing them.

The masking signals MS1, MS2 are applied to the dead zone changeover circuit 43. The dead-zone changeover circuit 43 includes two AND gates 51, 52 and an OR gate 53 which the outputs of these AND gates 51, 52 enter. The masking signal MS1 is applied to the AND gate 51, and the masking signal MS2 is applied to the AND gate 52. The dead-zone changeover signal inputted via the terminal 36 enters the AND gate 51 directly but is applied to the AND gate 52 after being inverted. In the case where the subordinate synchronizing signal generator 20 is used in the system shown in FIG. 2, the dead-zone changeover signal is held at the H level, and therefore the masking signal MS1 passes through the dead-zone circuit 43. In the case where the subordinate synchronizing signal generator 20 is used in the system shown in FIG. 1, the dead-zone changeover signal is held at the L level, and therefore the masking signal MS2 passes through the dead-zone circuit 43. The masking signal thus selected by the dead-zone changeover circuit 43 enters the OR gate 45.

A differentiating circuit 44 generates a differentiated pulse DP serving as the reset pulse RP. The differentiated pulse DP is a detection pulse indicative of detection of the leading edge (the negative-going transition) of the external horizontal synchronizing reference signal $HD_0$. The differentiating circuit 44 includes two D-type flip-flops 55, 56 and an AND gate 57. The clock signal is applied to the clock input terminal of each of the D-type flip-flops 55 and 56. The external horizontal synchronizing reference signal $HD_0$ is applied to the data input terminal of D-type flip-flop 55, and the non-inverted output of D-type flip-flop 55 is applied to the data input terminal of the D-type flip-flop 56. The inverted output of the D-type flip-flop 55 and the non-inverted output of the D-type flip-flop 56 enter the AND gate 57. The latter takes the AND function of these two input signals and outputs the result upon inverting it. Accordingly, when the external horizontal synchronizing reference signal $HD_0$ decays (namely at the leading edge of the signal $HD_0$), the differentiating circuit 44 generates the differentiated pulse DP, whose pulse width is equal to one period of the clock signal, and which decays at the leading edge (the positive-going transition) of the next clock pulse. The differentiated pulse DP is applied to the OR gate 45.

The durations of the dead zones 1 and 2 are equivalent to the H-level time periods of the masking signals MS1 and MS2, respectively. The differentiated pulse DP, on the other hand, is a negative pulse. Accordingly, the differentiated pulse DP generated when the masking signal is at the H level (the dead zone) does not pass through the OR gate 45. On the other hand, the differentiated pulse DP generated when the masking signal is at the L level (a zone other than the dead zone) passes through the OR gate 45 and is applied to the decoder 42 as the reset pulse RP. If necessary, a delay circuit may be provided at the output of the OR gate 45.

The reason for delaying the masking signals MS1, MS2 by one period of the clock signal relative to the respective dead zones 1, 2 is that the differentiated pulse DP is generated one clock period later than the leading edge of the external horizontal synchronizing reference signal $HD_0$.

Accordingly, as shown in FIGS. 10 and 11, if the leading edge of the external horizontal synchronizing reference signal $HD_0$ resides within the range of dead zone 1 or 2, the reset pulse RP is not generated. The reset pulse RP is applied to the decoder 42 only when the leading edge of the external horizontal synchronizing reference signal $HD_0$ is outside the range of dead zone 1 or 2.

In the system shown in FIG. 1, the large dead zone 2 is selected, as mentioned earlier. Accordingly, the reset pulse RP is applied to the decoder 42 only if the internal horizontal synchronizing reference signal $HD_i$ generated by the decoder 42 and the external horizontal synchronizing reference signal $HD_0$ are greatly out of synchronization, thereby causing the phase difference between these two signals to be so large that the PLL circuit cannot follow up. As a result of application of the reset signal RP, the phase difference between the internal horizontal synchronizing reference signal $HD_i$ and the external horizontal synchronizing reference signal $HD_0$ diminishes and the PLL circuit operates stably so that synchronization between the two signals $HD_i$, $HD_0$ is rapidly established.

In the system of FIG. 2, the narrow dead zone 1 is selected. Since the clock signal from the main synchronizing signal generator 10 is applied to the subordinate synchronizing signal generator 20B in the system of FIG. 2, reset processing of the decoder 42 is inhibited in the range of the very narrow dead zone 1 only in order prevent the occurrence of jitter due to a phase difference in the clock signals.

Figure 3:
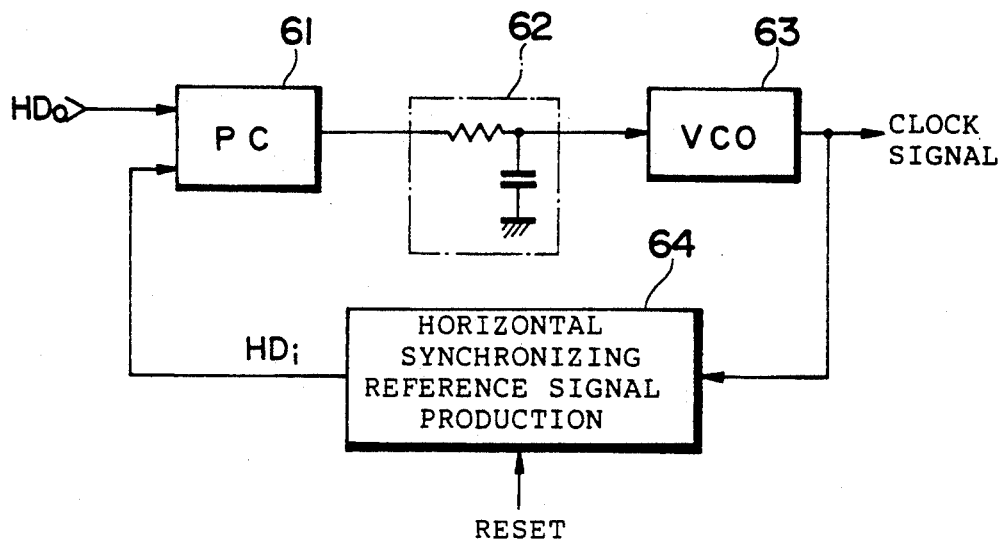
FIG. 3 is a block diagram illustrating an example of the construction of a horizontal synchronizing reference signal generating circuit which includes a PLL circuit.
Figure 4:
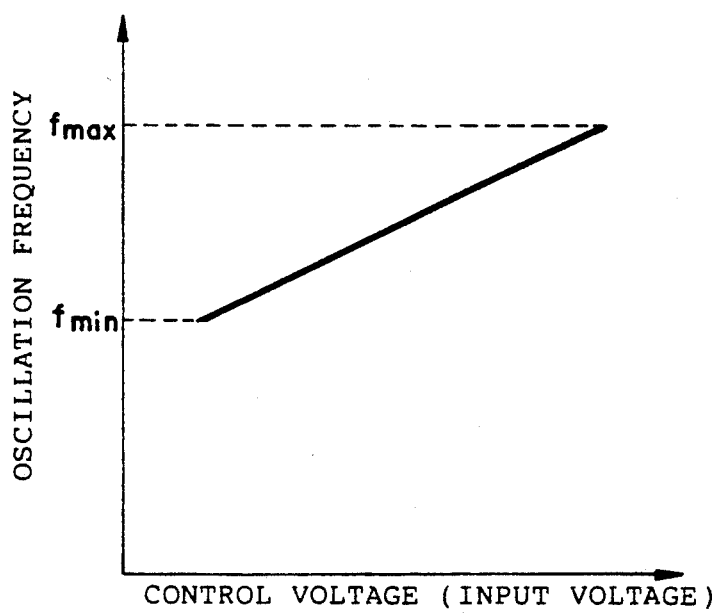
FIG. 4 is a graph illustrating the control-voltage/oscillation-frequency characteristic of a voltage-controlled oscillator.
Figure 12:
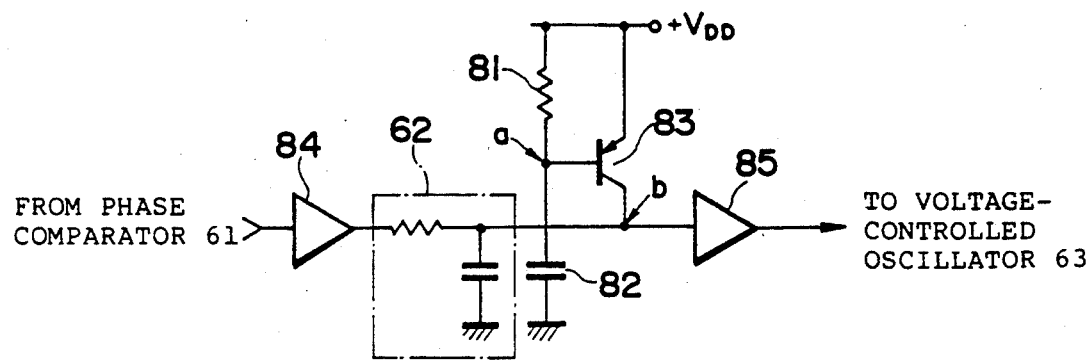
Figure 13:
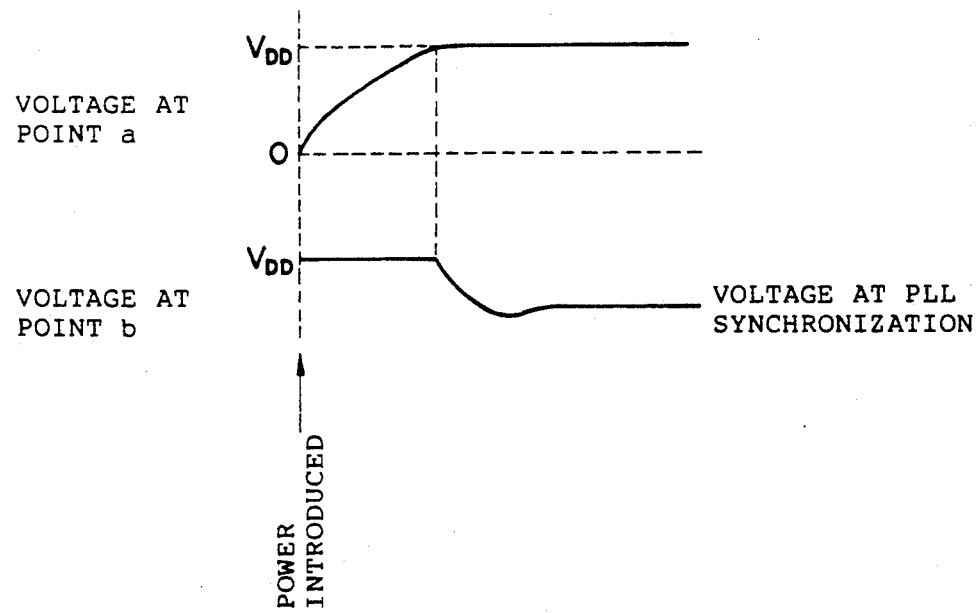

FIGS. 12 and 13 illustrate an embodiment according to third and fourth aspects of the present invention. FIG. 12 illustrates an example of a circuit to be connected between a phase comparator 61 and a voltage-controlled oscillator 63 in the circuit shown in FIG. 3. FIG. 13 illustrates voltage waveforms at points a and b in FIG. 12.

As shown in FIG. 12, a buffer amplifier circuit 84 is connected between the phase comparator 61 and a low-pass filter 62, and a buffer amplifier circuit 85 is connected between the low-pass filter 62 and the voltage-controlled oscillator 63. Further, a charging circuit including a serially connected resistor 81 and a capacitor 82 is provided, and the charging circuit is connected between an operating power supply $V_{DD}$ and ground. A pnp transistor 83 is provided and has its emitter connected to the operating power supply $V_{DD}$ and its collector connected to the input side of the buffer amplifier circuit 85. The base of the pnp transistor 83 is controlled by the charging voltage of the capacitor 82 in the charging circuit. Other components of the horizontal synchronizing reference signal generating circuit are the same as those shown in FIG. 3.

When the supply voltage has attained the value of $V_{DD}$ owing to introduction of power from the power supply, the capacitor 82 is not yet charged and the voltage at point a is zero. The pnp transistor 83, therefore, is in the conductive state. Accordingly, the voltage at point b on the input side of the buffer amplifier 85 is equal to the supply voltage $V_{DD}$. The capacitor 82 subsequently proceeds to charge through the resistor 81. Even though the pnp transistor 82 is held in the conductive state for a period of time, the pnp transistor 82 gradually makes a transition to the cut-off state as the voltage at point a rises. As a result, the voltage at point b approaches the output voltage of the low-pass filter 62.

Figure 6A:
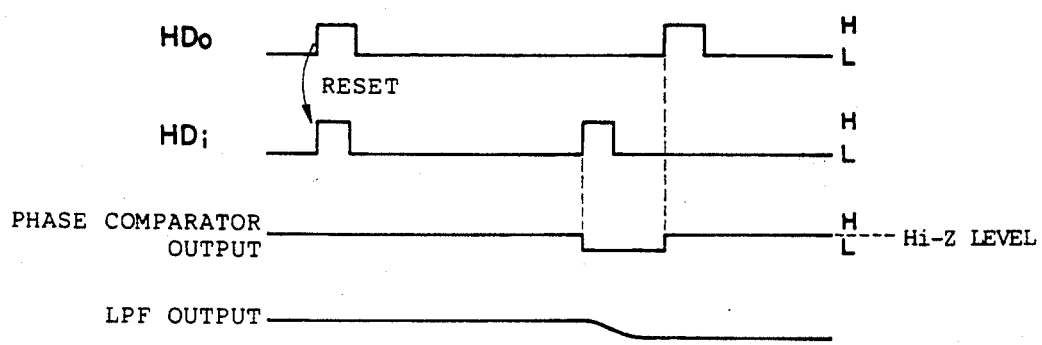
FIGS. 6a and 6b are waveform diagrams illustrating the operation of the above-mentioned horizontal synchronizing reference signal generating circuit.
Figure 6B:
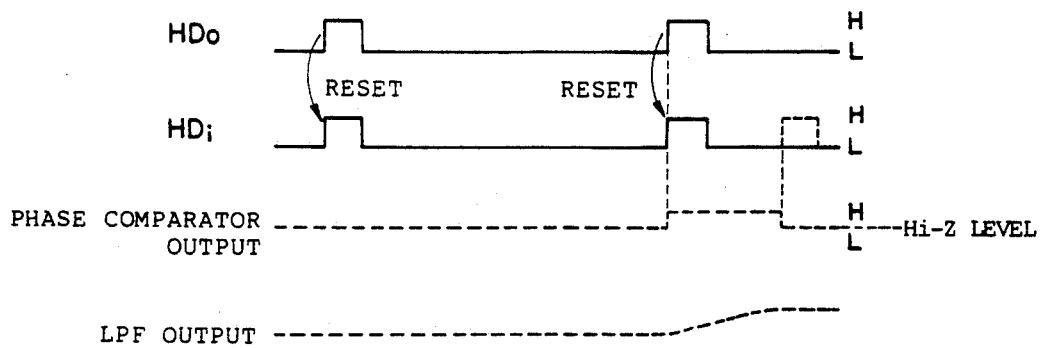

Since the voltage applied to the voltage-controlled oscillator 63 via the buffer amplifier circuit 85 is at a high value immediately after the introduction of power, the frequency of the oscillatory clock signal is high, the operation illustrated in FIG. 6a is performed and the pull-in operation of the PLL circuit is carried out in reliable fashion. As the voltage at point b declines, the phase difference between the external horizontal synchronizing reference signal $HD_0$ and the internal horizontal synchronizing reference signal $HD_i$ diminishes so that the two signals $HD_0$, $HD_i$ become synchronized in rapid fashion.

As many apparently widely different embodiments of the present invention can be made without departing from the spirit and scope thereof, it is to be understood that the invention is not limited to the specific embodiments thereof except as defined in the appended claims.

What is claimed is:

1. A horizontal synchronizing signal generating apparatus comprising:
   horizontal synchronizing reference signal producing means for producing a internal horizontal synchronizing reference signal based upon an inputted clock signal and a reset pulse;
   a phase comparator for comparing the phase of a given external horizontal synchronizing reference signal and the phase of an internal horizontal synchronizing reference signal outputted by said horizontal synchronizing reference signal producing means, and generating a phase comparator voltage signal conforming to a difference between the phases of said given external horizontal synchronizing reference signal and said internal horizontal synchronizing reference signal;
   a low-pass filter for passing low-frequency components of the phase comparator voltage signal outputted by said phase comparator;
   a voltage-controlled oscillator, whose oscillation frequency is controlled by a low-pass filter output voltage signal from said low-pass filter, for generating a clock signal applied to said horizontal synchronizing reference signal producing means;
   decision means for determining whether the phase difference between the phases of the internal horizontal synchronizing reference signal and the given external horizontal synchronizing reference signal lies within a follow-up range in which follow-up is capable of being performed by said voltage-controlled oscillator;
   reset-pulse generating means for generating a reset pulse synchronized to a prescribed edge of the given external horizontal synchronizing reference signal; and
   reset control means for inhibiting input of the reset pulse to said horizontal synchronizing reference signal producing means when said decision means determines that the phase difference lies within the follow-up range, and applying the reset signal to said horizontal synchronizing reference signal producing means when said decision means determines that the phase difference lies outside the follow-up range.

2. A horizontal synchronizing signal generating apparatus comprising:
   horizontal synchronizing reference signal producing means for producing an internal horizontal synchronizing reference signal based upon an inputted clock signal and a reset pulse;
   masking signal generating means for generating a first masking signal which decides a first dead zone in the vicinity of a prescribed edge of the internal horizontal synchronizing reference signal, and a second masking signal which decides a second dead zone wider than the first dead zone;
   dead-zone changeover means for selecting either the first or second masking signal dependent upon a dead-zone changeover signal;
   reset-pulse generating means for generating a reset pulse synchronized to a prescribed edge, which corresponds to said prescribed edge of the internal horizontal synchronizing reference signal, of a given external horizontal synchronizing reference signal; and
   reset control means for determining whether the prescribed edge of the given external horizontal synchronizing reference signal lies within the first or second dead zone decided by the first or second masking signal selected by said dead-zone decided by the first or second masking signal selected by said dead-zone changeover means, and applying the reset pulse to said horizontal synchronizing reference signal producing means when the prescribed edge of the given external horizontal synchronizing reference signal fails to lie within the first or second dead zone selected by the dead-zone changeover means.

3. A synchronizing signal generating apparatus comprising:
   a voltage-controlled oscillator for generating a clock signal in conformity with a control voltage applied thereto, wherein the frequency of the clock signal becomes higher as the control voltage becomes higher;
   synchronizing signal producing means for producing an internal synchronizing signal by frequency-dividing the clock signal generated by said voltage-controlled oscillator, and generating said internal synchronizing signal, which begins from a prescribed edge of a given external synchronizing signal, when a reset signal synchronized to the prescribed edge is applied;

an edge-detecting digital phase comparator for detecting, based on a comparison with the prescribed edge, a phase difference between the internal synchronizing signal outputted by said synchronizing signal producing means and the given external synchronizing signal, and for outputting a digital signal which represents the phase difference detected;

a low-pass filter responsive to a change in the digital signal outputted by said edge-detecting digital phase comparator for generating a first control voltage when the phase of the internal synchronizing signal leads the phase of the external synchronizing signal, and a second control voltage lower than said first control voltage when the phase of the internal synchronizing signal lags behind the phase of the external synchronizing signal, and applying the first or second control voltage generated to said voltage-controlled oscillator; and forcible pull-in means for applying, to said voltage-controlled oscillator for a prescribed period of time immediately following introducing of power, a control voltage high enough to generate a clock signal whose frequency is higher than a central frequency of said voltage-controlled oscillator.

4. A synchronizing method of a synchronizing signal generating apparatus having a voltage-controlled oscillator for generating a click signal whose frequency varies in proportion with a control voltage applied thereto, synchronizing signal producing means for producing an internal synchronizing signal by frequency-dividing the clock signal provided by the voltage-controlled oscillator, and generating an internal synchronizing signal, which begins from a prescribed edge of a given external synchronizing signal, when a reset signal synchronized to the prescribed edge is applied, an edge-detecting digital phase comparator for detecting, based on a comparison with the prescribed edge, a phase difference between the internal synchronizing signal outputted by the synchronizing signal producing means and the given external synchronizing signal, and for outputting a digital signal which represents the phase difference detected, and a low-pass filter for generating a control voltage, which is to be applied to the voltage-controlled oscillator, whose lever varies in response to a change in the digital signal outputted by the edge-detecting digital phase comparator, said method comprising the steps of:

applying, to said voltage-controlled oscillator at start-up of said synchronizing signal producing means, a control voltage whose level causes generation of a clock signal whose frequency is higher than a center frequency of said voltage-controlled oscillator; and synchronizing the internal synchronizing signal to the given external synchronizing signal in a process which causes the frequency of the clock signal to change from a first frequency to a second frequency lower than said first frequency.

5. A method for generating a horizontal synchronizing signal, comprising the steps of:

(a) producing an internal horizontal synchronizing reference signal based upon an inputted clock signal and a reset pulse;

(b) comparing the phase of a given external horizontal synchronizing reference signal and the phase of an internal horizontal synchronizing reference signal produced at said step (a);

(c) generating a phase comparator voltage signal conforming to a difference between the phases of said given external horizontal synchronizing reference signal and said internal horizontal synchronizing reference signal;

(d) passing low frequency components of said phase comparator voltage signal generated at said step (c) to develop a low-pass filter output voltage signal;

(e) generating a clock signal applied to said step (a) by a voltage-controlled oscillator whose oscillation frequency is controlled by said low-pass filter output voltage signal;

(f) determining whether the phase difference between the phases of said internal horizontal synchronizing reference signal and said given external horizontal synchronizing reference signal lies within a follow-up range in which follow-up is capable of being performed by said voltage-controlled oscillator;

(g) generating a reset pulse synchronized to a prescribed edge of said given external horizontal synchronizing reference signal;

(h) inhibiting input of said reset pulse at said step (a) when said phase difference is determined to lie within said follow-up range at said step (f); and (i) applying said reset signal at said step (a) when said phase difference is determined to lie outside said follow-up range at said step (f).

6. A method for generating a horizontal synchronizing signal, comprising the steps of:

(a) producing an internal horizontal synchronizing reference signal based upon an inputted clock signal and a reset pulse;

(b) generating a first masking signal which decides a first dead-zone in the vicinity of a prescribed edge of said internal horizontal synchronizing reference signal;

(c) generating a second masking signal which decides a second dead-zone wider than said first dead-zone;

(d) selecting either said first or second masking signal in response to a dead-zone changeover signal;

(e) generating a reset pulse synchronized to a prescribed edge of a given external horizontal synchronizing reference signal, which corresponds to said prescribed edge of said internal horizontal synchronizing reference signal;

(f) determining whether said prescribed edge of said given external horizontal synchronizing reference signal lies within said first or second dead-zone decided by said first or second masking signal selected at said step (d); and (g) applying said rest pulse at said step (a) when said prescribed edge of said given external horizontal synchronizing reference signal fails to lie within said first or second dead-zone selected at said step (d).

7. A method for generating a horizontal synchronizing signal, comprising the steps of:

(a) generating a clock signal by a voltage-controlled oscillator in conformity with an applied control voltage so that the frequency of said clock signal becomes higher as said applied control voltage becomes higher;

(b) producing an internal synchronizing signal by frequency-dividing said clock signal generated at said step (a);

(c) generating said internal synchronizing signal from a prescribed edge of a given external synchronizing signal when a reset signal synchronized to said prescribed edge of said given external synchronizing signal is applied;

(d) detecting a phase difference between said internal synchronizing signal generated at said step (c) and said given external synchronizing signal based on a comparison with said prescribed edge of said given external synchronizing signal;

(e) outputting a digital signal which represents said phase difference detected at said step (d);

(f) generating a first control voltage when the phase of said internal synchronizing signal leads the phase of said external synchronizing signal responsive to a change in said digital signal outputted at said step (e);

(g) generating a second control voltage lower than said first control voltage when the phase of said internal synchronizing signal lags behind the phase of said external synchronizing signal;

(h) applying said first control voltage generated at said step (f) or said second control voltage generated at said step (g) as said applied control voltage at said step (a); and (i) applying a clock control voltage to said voltage-controlled oscillator for a prescribed period of time immediately following introduction of power high enough to generate a clock signal whose frequency is higher than a central frequency of said voltage-controlled oscillator.

8. A synchronizing signal generating apparatus, comprising:

a voltage-controlled oscillator for generating a clock signal whose frequency varies in proportion with a control voltage applied thereto;

synchronizing signal producing means for producing an internal synchronizing signal by frequency-dividing said clock signal provided by said voltage-controlled oscillator and generating an internal synchronizing signal, which begins from a prescribed edge of a given external synchronizing signal, when a reset signal synchronized to said prescribed edge of said given external synchronizing signal is applied;

an edge-detecting digital phase comparator for detecting a phase difference between said internal synchronizing signal outputted by said synchronizing signal producing means and said given external synchronizing signal based on a comparison with said prescribed edge of said given external synchronizing signal and outputting a digital signal which represents said phase difference detected;

a low-pass filter for generating a control voltage, which is to be applied to said voltage-controlled oscillator, whose level varies in response to a change in said digital signal outputted by said edge-detecting digital phase comparator;

control voltage applying means for applying, to said voltage-controlled oscillator at start-up of said synchronizing signal producing means, a control voltage whose level causes generation of a clock signal whose frequency is higher than a center frequency of said voltage-controlled oscillator; and synchronizing means for synchronizing said internal synchronizing signal to said given external synchronizing signal to a process which causes the frequency of said clock signal to change from a first frequency to a second frequency lower than said first frequency.

* * * * *